United States Patent [19]

Ball et al.

[11] 3,947,741

[45] Mar. 30, 1976

[54] BOAT GUIDANCE SYSTEM

[75] Inventors: Kenneth H. Ball, Tarzana; Arthur L. Cole, Jr., Saugus, both of Calif.

[73] Assignee: Walt Disney Productions, Burbank, Calif.

[22] Filed: Jan. 15, 1974

[21] Appl. No.: 433,505

[52] U.S. Cl. ............... 318/588; 318/16; 318/576; 318/587
[51] Int. Cl.² B63H 25/02; G05D 1/00; B64C 13/18
[58] Field of Search ............ 318/16, 587, 576, 588, 318/608; 180/98; 235/150.26, 150.27

[56] References Cited
UNITED STATES PATENTS

| | | | |
|---|---|---|---|
| 3,033,305 | 5/1962 | Harned et al. | 318/587 X |
| 3,132,710 | 5/1964 | Petrella et al. | 180/98 X |
| 3,556,244 | 1/1971 | Gray | 318/587 X |
| 3,612,206 | 10/1971 | Ohntrup | 318/587 X |
| 3,614,990 | 10/1971 | Schnitzler | 318/587 X |
| 3,757,887 | 9/1973 | Moore et al. | 318/587 X |
| 3,768,586 | 10/1973 | Thompson et al. | 318/587 X |

*Primary Examiner*—Robert K. Schaefer
*Assistant Examiner*—John J. Feldhaus
*Attorney, Agent, or Firm*—Fulwider, Patton, Rieber, Lee & Utecht

[57] ABSTRACT

A guidance system for controlling the path of a boat comprising a first conductor disposed below the surface of water in a first elongated loop and connecting at the terminals thereof across an A.C. source of electrical signal and a second conductor driven in a quadrature with the first conductor and disposed in a second loop partly superposed over the first loop. A first and second orthogonal inductive coil, mounted in the boat along a plane parallel to the loop and a plane normal to the loop plane and substantially parallel to the centerline thereof sense the vertical and horizontal components of the electromagnetic field generated about the conductor loops to produce corresponding induced signals respectively varying in amplitude and phase according to the amplitude of the electromagnetic field and the position thereof. Such induced signal of the first and second coils are then clipped by signal limiters and connected to a common phase detector to produce a phase angle signal indicative of the amplitude of deviation of the coils relative the loops. The phase detector output signal is then connected to control a steering apparatus.

10 Claims, 7 Drawing Figures

BOAT GUIDANCE SYSTEM

BACKGROUND OF THE INVENTION

1. Field of the Invention

The present invention relates to guidance systems, and more particularly to guidance systems responsive to the lateral displacement of a guided object from the center of an electromagnetic signal generated by elongated conductor loops excited in guadrature by an A.C. electrical signal source.

2. Description of the Prior Art

Automatic guidance systems typically take on a variety of forms, the more complex of such forms being guidance systems which control a moving object both along a preselected path and according to a predetermined sequence of velocities. The less complex guidance systems, having generally a wider potential application in commercial use, are guidance systems which control the lateral displacement of the object along a predetermined path. Generally such guidance systems are signal following systems where the attitude of the object is controlled in response to lateral deviations thereof from the signal center and the resulting dynamics of motion of the object complete in the guidance loop. In applications where the attitude produced control power of the guided object is weak in comparison with the inertia of the object, such as the applications where a relatively large displacement boat is controlled to follow a particular signal track, large amounts of lead or anticipation are necessary in order to control the lateral accuracy of the boat path. Furthermore, even if anticipated, the corrective dynamics of motion are typically underdamped and of low frequency, resulting in large corrective overshoots. Even if augmented to reduce the overshoots the overall gain of such systems is typically low and many attempts have been made in the past to reduce the overall loop errors. One major contributor producing a low loop gain has been the sensor system which functions to identify the tracked signal center as well as any deviations therefrom.

Thus in guidance applications where a mobile object is directed to follow a preselected signal track the signal pick-offs or sensors determining the signal center and the relative lateral location of the object are typically the limiting constraints on the overall tracking accuracy of the system. Such guidance loops depend on a linear displacement from the signal center and accordingly the inherent characteristics of the loop are those of a first order servo having the typical steady state errors which are a function of the loop gain and therefore the sensitivity of the sensors. Control systems of this kind, when utilized for public conveyance purposes, must, however, be both accurate and highly reliable to properly perform stationing functions such as docking at loading platforms. Heretofore most prior art guidance systems adapted for commercial use entailed elaborate sensors requiring extensive augmentation, control power and maintenance and care in operation. Furthermore, most such sensing devices were amplitude responsive and therefore sensitive to signal attenuation or drop off through any medium, while also being constantly driven at maximum loop gain, there being no convenient means for passively controlling gain where higher accuracy was required. Particularly when applied to amusement vehicles such as guided boats floating or propelled along preselected channels in waters which are heavily saturated with various contaminants thrown there by the passengers, such boats being loaded to varying displacement depths, a guidance system which is simple and inherently insensitive to the varying attenuation through the medium is desirable.

SUMMARY OF THE INVENTION

Accordingly, it is the general purpose and object of the present invention to provide a guidance system which can conveniently discriminate the signal center of the signal track and is substantially insensitive to the received amplitude fluctuations thereof. Another object of the invention is to provide a guidance system which is inherently reliable and easy to maintain. A further object of the invention is to provide a guidance system which is particularly suitable for controlling the horizontal or surface path of a floating platform, such as a boat, within narrow canals at varying vertical displacements relative submerged signal sources. Yet another object of the present invention is to provide a guidance system which can be conveniently set to varying gain levels along the path.

Briefly, these and other objects are accomplished within the present invention by disposing a first insulated conductor arranged in a first elongated loop in a horizontal plane below the surface of a canal along which a boat is to be guided, the two ends of the conductor being connected at the ends across a source generating an A.C. electrical signal. A second conductor connected to be driven in quadrature, with the first conductor is disposed to form a second loop substantially equal to the length of the first loop and partly overlapping laterally the first loop. The electromagnetic field thus generated about the first and second conductors forming the first and second loops is picked up by a first and second inductive coil, arranged in normal relationship, the first coil being disposed in a plane parallel to the plane of the conductor loops while the second coil is disposed in a plane substantially normal and parallel to the longitudinal axes thereof. In this manner the first inductive coil is responsive to the vertical components of the electromagnetic flux around the looped conductors which are invariant with lateral displacement within the loop overlap while the second coil is responsive to the transverse or horizontal components of the magnetic flux and therefore is both phase and amplitude sensitive to the lateral displacement therefrom. Since the longitudinal dimension of the loops is greater than its width such horizontal components of flux are essentially transverse to the longitudinal centerline of the loop. The induced signals on the first and second coils are collected at the respective inputs of a first and second squaring or clipping circuit and the square wave outputs of the clipping circuits are compared in a phase detector to provide an error signal indicative in phase and amplitude of the polarity and the amount of deviation of the vehicle from the signal center of the magnetic field generated about the first and second loops. This error signal is then amplified through a conventional servo amplifier which completes a servo loop driving a control rudder to correct the deviation.

In a second embodiment the error signal produced by the phase detector is connected to a fore and aft servo loop controlling in complement corresponding fore and aft water jets to direct the respective output streams thereof into corresponding fore and aft paired complementary turning ducts to produce a corrective turning moment about the boat.

DESCRIPTION OF THE SPECIFIC EMBODIMENT

The present invention is directed at a guidance system adapted to select the signal center of two superposed electromagnetic fields developed about two elongated conductor loops excited in quadrature, and to provide a phase responsive signal indicative of the deviation error therefrom. A guidance system of this type, responsive to a magnetic field, includes inductive pick-ups or coils which are amplitude and phase responsive to the flux developed within the magnetic field. In order to isolate any measurement variances associated with variations in attenuation inherent through any real environment a magnetic field is generated about the two loops in quadrature and the combined field flux is resolved by inductive sensors having orthogonal response axes in a plane transverse to the longitudinal axis of the loops, the induced signal received at the respective inductive sensors is then clipped or limited and thereby rendered insensitive to any signal losses through the environment, and the clipped signal is then compared in a common phase detector to provide a control signal indicative in phase and amplitude to the direction and amplitude of the deviation error.

Figure 1:
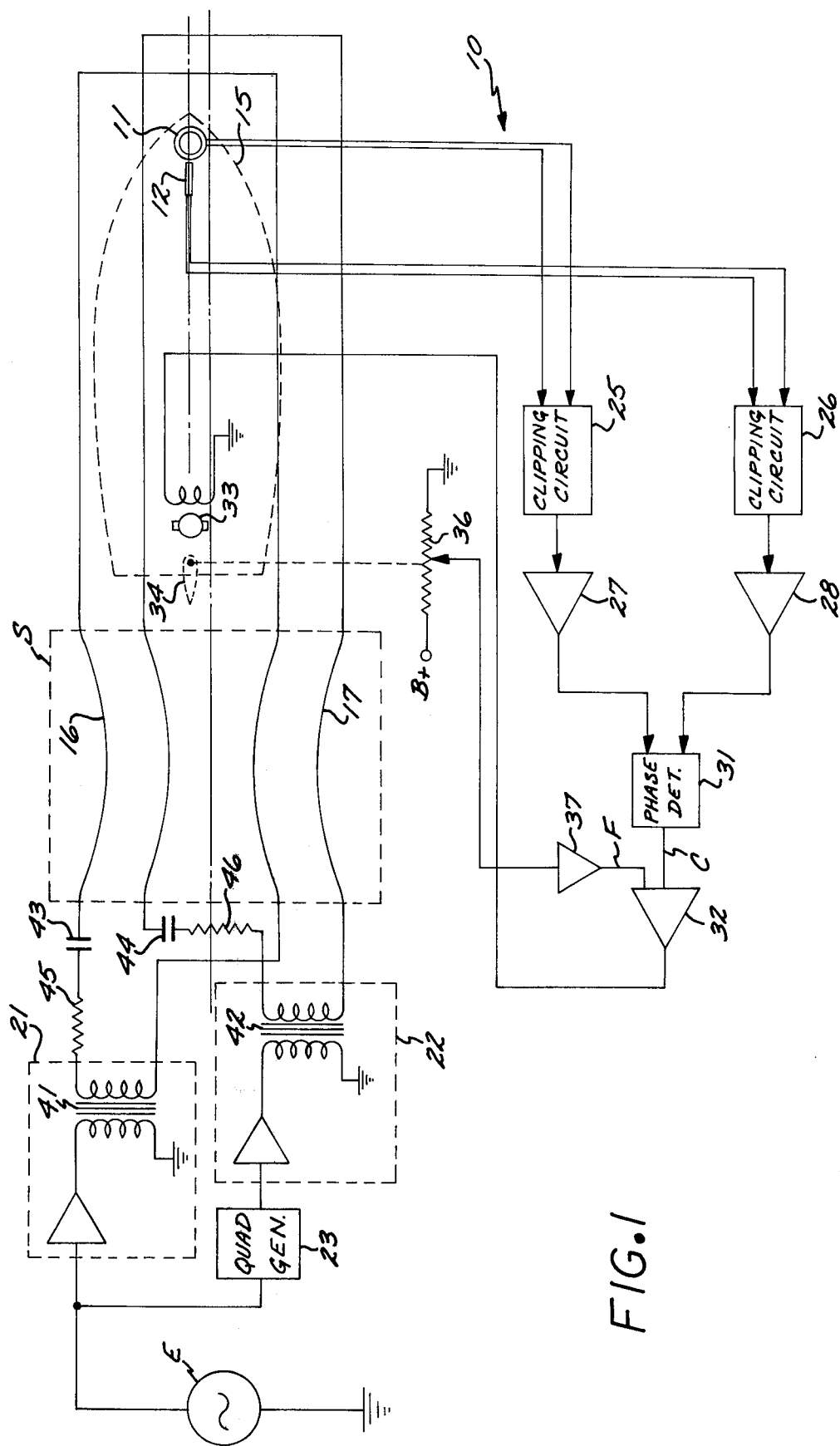
FIG. 1 is a block diagram of a first embodiment of a boat guidance system constructed according to the present invention.

As shown in FIG. 1, a guidance loop, generally designated 10, includes a vertically disposed inductive sensor or coil 11 and a horizontally disposed inductive sensor or coil 12, coils 11 and 12 being mounted within the bow cavity of a boat 15 to respectively sense the vertical component of flux and the horizontal component of flux generated by an electromagnetic field around two elongated and superposed conductor loops 16 and 17. Conductor loops 16 and 17 each comprise sections of insulated wire respectively connected across the output terminals of corresponding power amplifiers 21 and 22. Amplifiers 21 and 22 are conventional low output impedance power amplifiers such as the amplifiers Model No. 42280A, distributed by the Altec Company, 1515 Manchester Avenue, Anaheim, California. Amplifier 21 receives at the input an alternating signal developed by an A.C. signal source E while amplifier 22 is driven in quadrature with amplifier 21 by a quadrature generator 23 which is also driven by the signal source E. Quadrature generator 23 can be any conventional quadrature generator (such as an operational integrator driven at a relatively high gain to substantially provide zero attenuation of the signal developed by source E at the frequency thereof). Accordingly loops 16 and 17 have imposed thereacross alternating electrical signals which are spaced apart in phase angle by 90°. Loop 16, for example, forms a circular conductor which is connected to the amplifier 21 to provide a positive and negative or return section thereon. Loop 17 is arranged similarly in a positive and return configuration. Loops 16 and 17 are partly superposed with the positive sections and negative sections arranged in adjacent relationship. The positive and negative sections of the corresponding loops 16 and 17 are arranged in parallel proximity relative each other. The gap thus formed between the centrally arranged corresponding positive section of loop 17 and negative section of loop 16 provides the effective tracking band of the guidance system.

In order to conserve the power consumption loops 16 and 17 are each connected in the manner of a resonating circuit across respective secondary windings of output transformers 41 and 42 in amplifiers 21 and 22, coupled therewith by corresponding capacitors 43 and 44. Also included in the loops are corresponding resistors 45 and 46, resistors 45 and 46 combining with capacitors 43 and 44 and the associated inductance and capacitive leakage of the loops 16 and 17 to provide a high Q, or resonance, at the driving frequency of the loops.

Figure 2:
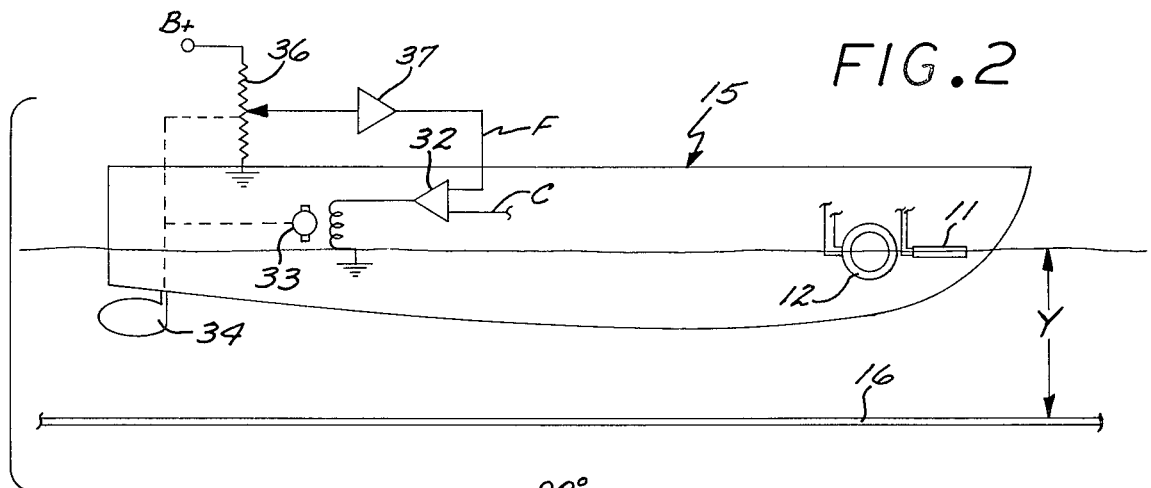
FIG. 2 is a diagrammatic side view of a boat having disposed therein guidance sensors constructed according to the present invention.

As illustrated in FIG. 2, coils 11 and 12 are mounted forwards within the bow cavity of the boat 15 to provide a lead factor in the response thereof to the lateral displacement of the boat. The vertical displacement designated as depth $y$, which varies with loading, provides a first increment of variation to the field levels sensed by the coils, it being understood that the field strength around any linear section of a conductor drops off as the inverse ratio of the distance squared therefrom. Thus the field strength at the coils 11 and 12 is in nonlinear inverse proportion to the displacement depth $y$, being further aggravated by the pitching motion of the boat 15, the permeability of the medium and any losses occurring across the hull. Such variations in field strength convert directly to variations in gain of the loop which controls the angular displacement of rudder 34 and therefore the response of the boat 15 to lateral errors.

Loops 16 and 17 are driven in quadrature and the combined signal picked up by coils 11 and 12 resulting from the superposition thereof will exhibit, within the tracking band, a phase relationship which, when converted to zero crossings by the clipping circuits, is correlated to the displacement of a sensor. In particular the signal developed at coils 11 and 12 results from the superposition of the magnetic fields developed by loops 16 and 17 which is clipped to form a square wave pulse train having pulses bounded by the zero crossings of the signal at each coil.

Figure 3:
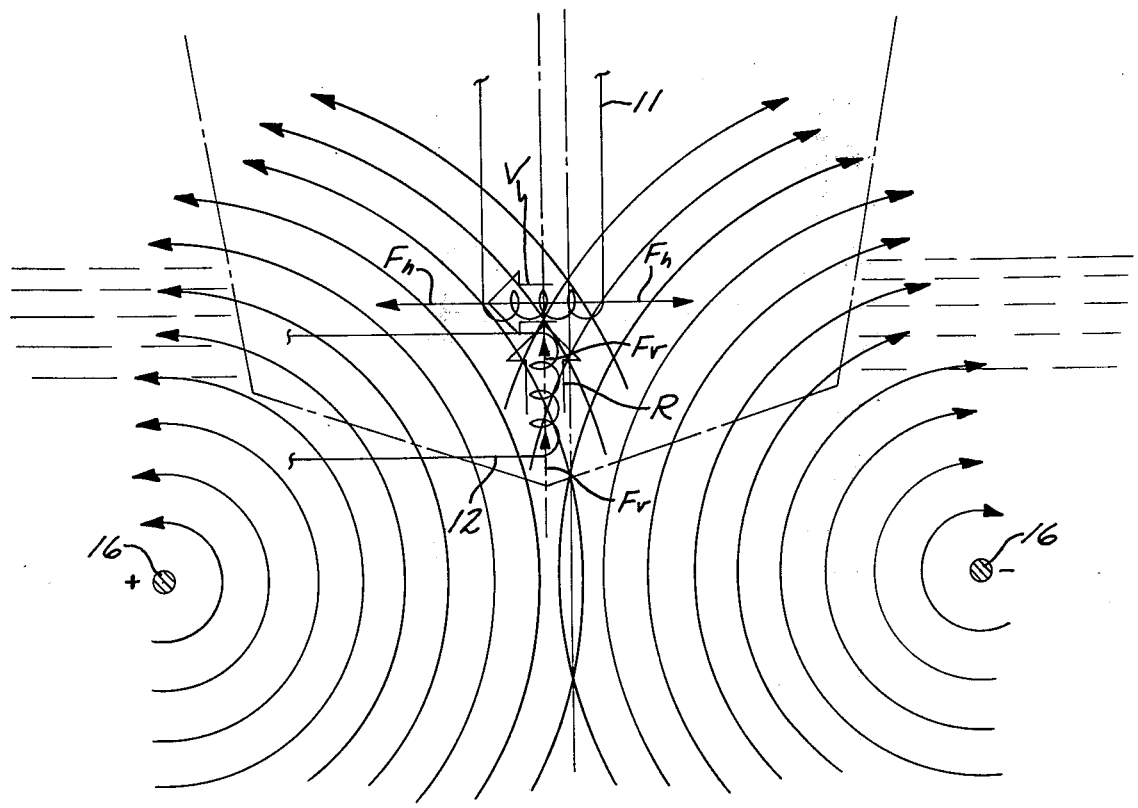
FIG. 3 is a field diagram of an electromagnetic field signal developed about circular conductors driven by corresponding A.C. signals.

As illustrated in FIG. 3, the horizontal coil 12 is responsive to the vertical components of the magnetic flux designated $F_v$ generated by the field around the two conductor loops. The vertical components are directly additive and therefore are constant within the band defined above. Thus the resulting induced signal vector R on coil 12 is substantially constant both in amplitude and phase throughout any lateral displacement of boat 15. On the other hand the resulting induced signal vector V on coil 11 comprises a combination of the horizontal components of the flux designated $F_h$ which are of opposite polarity for the corresponding sections of either loop 16 or loop 17. As the sensor is displaced towards either side the phase angle of the zero crossing shifts over to correspond more with the phase angle of the zero crossing of that particular section of the loop.

These features are particularly adapted to provide a guidance system which is responsive to phase only and therefore insensitive to any amplitude losses through the environment. More specifically, coils 11 and 12 sense the superposed fields generated around both loops 16 and 17, coil 12 receiving a constant phase field signal to produce a reference signal while coil 11 receiving a signal which varies in phase as the respective sections of loops 16 and 17 are approached. Clipping circuits 25 and 26 convert the combined sinusoidal function signal produced by the coils into a square wave bounded by the zero crossing of the associated field vectors, where the square wave output of clipping circuit 25 is essentially constant while the square wave output of circuit 26 varies in the phase with the location of coil 12. The square wave signals developed by circuits 25 and 26 are amplified to oscillate between fixed limits by corresponding amplifier circuits 27 and 28, the outputs thereof being collected at a phase detector 31 to provide a control signal C to a conventional servo amplifier 32. Servo amplifier 32 drives a servo motor 33 to control rudder 34 in a particular corrective orientation, driving the boat 15 back to the center of the field signal. Amplifier 32 receives at its input both the signal C and a feedback signal F across a feedback amplifier 37 amplifying a signal developed by a potentiometer 36 connected between a D.C. signal B+ and ground and engaged to be mechanically actuated along with the actuation of the rudder 34.

Figure 4:
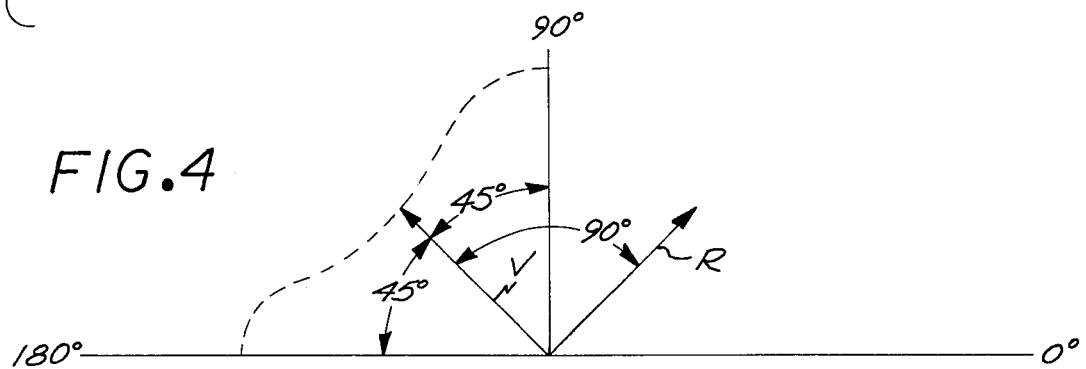
FIG. 4 is a vector diagram illustrating the amplitude and phase of a guidance signal developed by the sensors of FIG. 2.

FIG. 4 illustrates the resulting signal vectors developed across coils 11 and 12. Specifically shown in the right positive quadrant is a signal vector R which represents the magnitude and phase angle of the signal developed across coil 12. Within the tracking band set forth above the phase angle of the signal vector R is substantially constant at +45° as developed by vector sum of the vertical field component $F_v$ associated with the summation of the superposed vertical field components of loops 16 and 17. Thus the signal vector R is constant in phase and varies in amplitude as a function of the field strength at the coil. The vertical coil 11, on the other hand, produces a signal vector V, nominally at 90° with vector R when centered due to the orthogonal orientation of this coil with coil 12, which varies in phase angle between a 90° phase angle corresponding to the positive lead section of loop 17 and 180° phase angle associated with the negative lead section of loop about a nominal phase angle of 135°. These lead sections define the tracking band as described above. Thus the amplitude of signal vector V varies both with phase angle and attenuation of the field signal. It is to be further understood that the positive section of loop 17 and the negative section of loop 16 serve to define the left and right hand limits of the tracking band thereby providing a linear correlation between lateral displacement and phase angle of signal vector V. In this manner a system of signal sensors is produced which is self-referencing by virtue of coil 12 and which is phase responsive to lateral deviations from the center of the tracking signal. The signals developed across coils 11 and 12 are combined in a phase detector further described below which conventionally produces a zero error signal C when signal vectors V and R are at 90° phase and a positive or negative signal C of increasing amplitude as the phase angle of vector V varies between 90° and 180°. The effective signal gain or phase angle versus lateral deviation of signal vector V can be further controlled by the width of the tracking band and in order to facilitate high accuracy docking the separation between loops 16 and 17 can be narrowed as illustrated in FIG. 1 within the section designated S.

Figure 5:
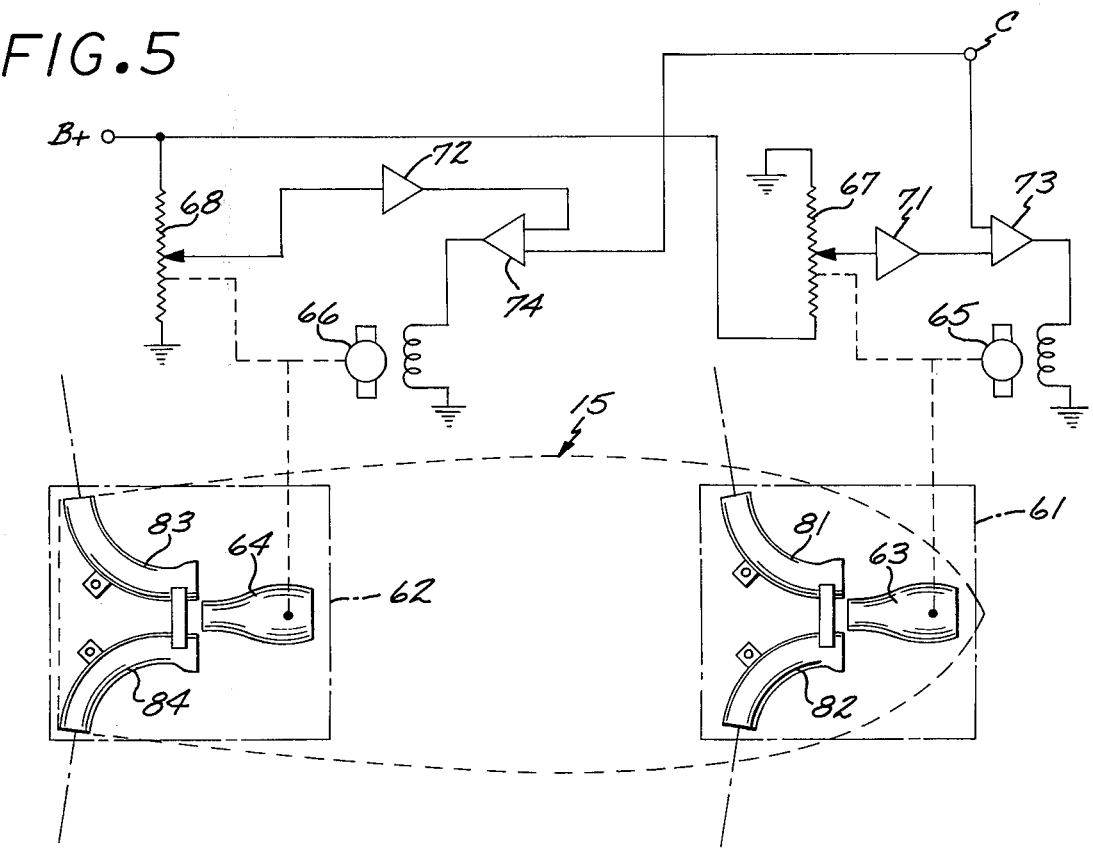
FIG. 5 is a top view diagrammatic illustration of yet another embodiment of a control system rendered responsive by the sensors of FIG. 2.
Figure 6:
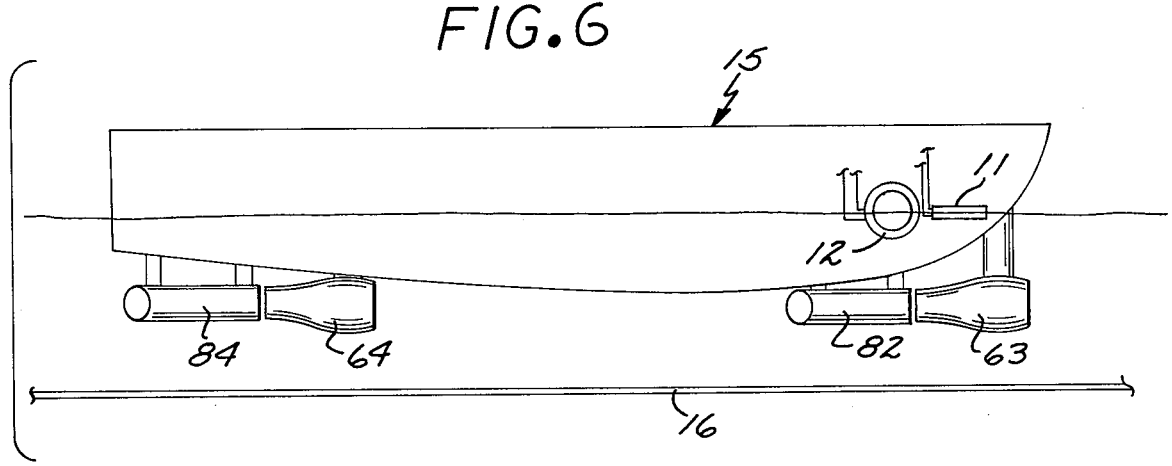
FIG. 6 is a side view diagrammatic illustration of the control system shown in FIG. 5.

As shown in FIGS. 5 and 6, yet another embodiment of a control system responsive to the error signal C includes a fore and aft jet assembly 61 and 62. Assemblies 61 and 62 each include corresponding water jets 63 and 64 mounted for horizontal rotation below the bottom surface of boat 15 and driven in rotation by corresponding associated servo motors 65 and 66. Associated further with the respective water jets 63 and 64 are corresponding potentiometers 67 and 68, varying in resistance with the angular position of jets 63 and 64, connected in a complementary manner at corresponding opposite ends between a source of D.C. signal B+ and ground. The respective wiper connections of potentiometers 67 and 68 are fed back across associated feedback amplifiers 71 and 72 to the inverting input terminals of corresponding servo amplifiers 73 and 74 which are also connected at the noninverting terminals to receive the error signal C and which connect at the output terminals to drive the associated servo motors 65 and 66. In this manner two servo loops control in complement the angular position of jets 63 and 64 at gain levels set by the sensitivity of the potentiometers 67 and 68 and the respective gains of the feedback amplifiers 71 and 72.

In order to increase the control power of the respective control loops each assembly 61 and 62 further includes corresponding paired in opposing relationship turning ducts 81 and 82 and 83 and 84. Ducts 81 and 82 are mounted below the bottom surface of boat 15 to align the input ends thereof in a receiving relationship with the high velocity stream developed by jet 63, the receiving ends thereof being further spaced apart horizontally to permit a free passage of the jet stream therebetween when the jet 63 is aligned along the centerline of boat 15. Ducts 81 and 82 furthermore are of an enlarged cross section to allow for the receipt of the entrained boundary layer flow around the jet stream and thereby increase the control power thereof. The output ends of ducts 81 and 82 are turned in a horizontal plane to provide flow exit along substantially opposed axes such that small changes in angular position of jet 63 results in large lateral components of force at either output end to produce turning moments on boat 15. In a similar fashion the aft jet assembly 62 drives the jet 64 between turning ducts 83 and 84 in a direction opposite to jet 63, as provided by the complementary connection of potentiometers 67 and 68, to produce an opposing lateral force and a complementary turning moment directed by signal C adding to the moment generated by assembly 61.

Figure 7:
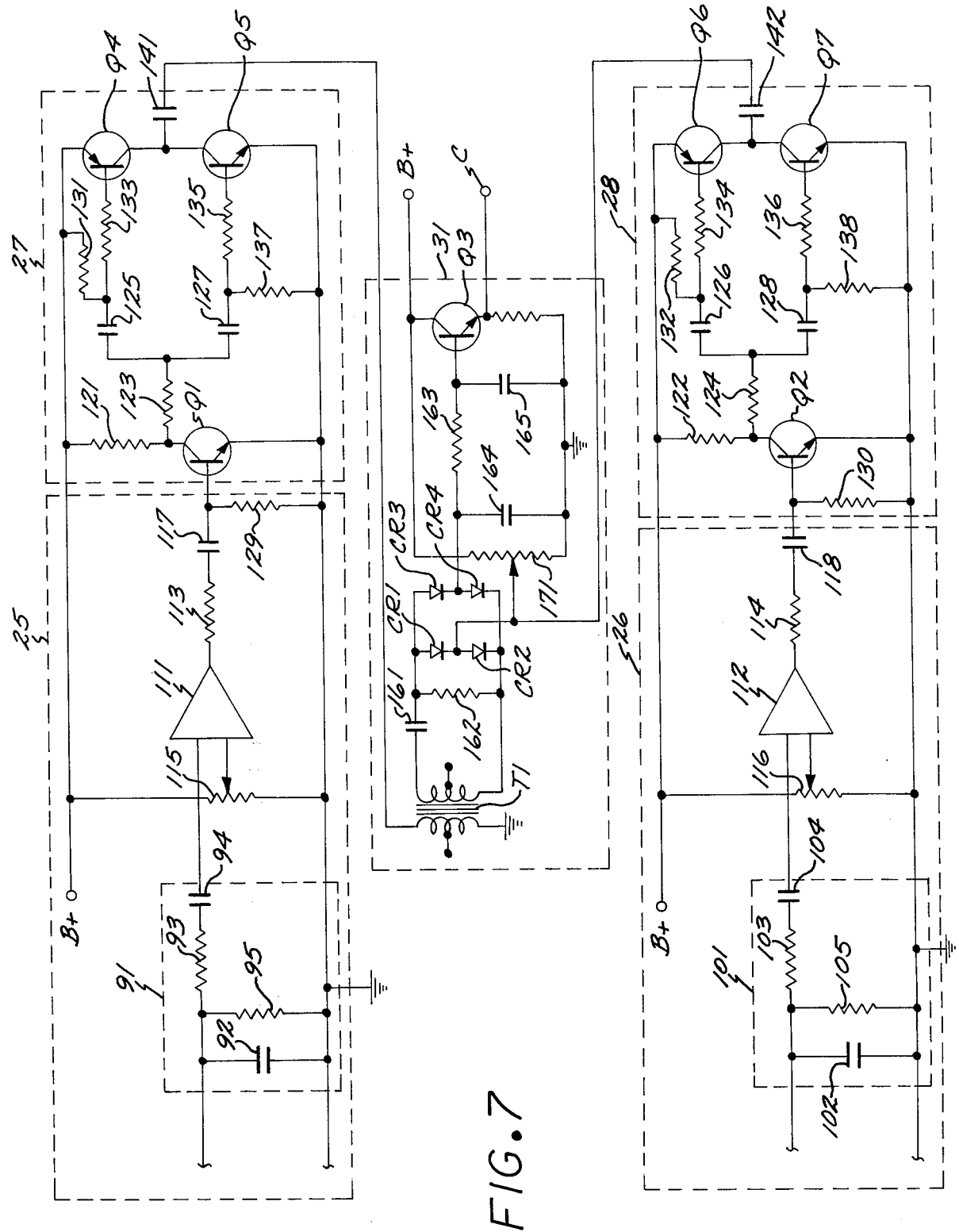
FIG. 7 is a circuit schematic of a detector circuit constructed according to the present invention.

One example of the particular circuit elements accomplishing the amplification function of amplifiers 27 and 28, the clipping function of clipping circuits 25 and 26 and the phase detection function of phase detector 31 are set forth in the circuit shown in FIG. 7, such circuit being adapted to issue the control signal C both to the rudder control system shown in FIG. 1 and the water jet controls shown in FIGS. 5 and 6. In particular the signal first developed at coil 11 is received in clipping circuit 25 across a bandpass filter circuit 91 tuned to the excitation frequency of the A.C. signal source E, such filter circuit forming a passive bandpass filter having the high frequency cut-off substantially set by a capacitor 92 connected in shunt across coil 11 and a series connected resistor 93 while the low frequency cut-off is substantially set by a coupling capacitor 94 and a shunting resistor 95. Similarly the output signal of coil 12 is received in the clipping circuit 26 across a second bandpass filter 101 including a shunt capacitor 102, a series resistor 103, a coupling capacitor 104 and a shunt resistor 105. The respective output signals from filters 91 and 101 are received at the non-inverting input terminals of corresponding operational amplifiers 111 and 112 connected in open loop circuit to operate at the typical open loop high gain between saturation limits in response to the signals developed by coils 11 and 12, amplifier 111 being referenced against a reference signal developed by a voltage divider 115 connected at the wiper to the inverting input of the amplifier and forming a parallel circuit across signal B+ and ground. Similarly, clipping circuit 26 includes the high gain operational amplifier 112 referenced to a voltage divider 116, amplifier 112 operating between saturating limits for any reel signal levels of coil 12. Amplifiers 111 and 112 are respectively connected at the outputs thereof across associated coupling resistors 113 and 114 and capacitors 117 and 118 to respective amplifiers 27 and 28 at the corresponding base terminals of common emitter connected transistors Q1 and Q2, where the base terminals of transistors Q1 and Q2 are further biased relative ground by corresponding base biasing resistors 129 and 130. The collector terminal of transistor Q1 connects both across a collector resistor 121 to the source of D.C. signal B+ and across a limiting resistor 123 to a pair of coupling capacitors 125 and 127 to corresponding base biasing circuits respectively including resistors 131 and 133, and 135 and 137 of two push-pull configured transistors Q4 and Q5 connected by the emitters across signal B+ and ground. The collectors of transistors Q4 and Q5 are connected in common across a coupling capacitor 141 to one end of a primary winding of a transformer T1 in the phase detector 31. Similarly the collector of transistor Q2 connects across a collector resistor 122 to signal B+ and across resistor 124 to paired coupling capacitors 126 and 128 which drive the base biasing circuits, including resistors 132, 134, 136 and 138, of push-pull transistors Q6 and Q7 also connected across signal B+ and ground. The collectors of transistors Q6 and Q7 are again connected across a coupling capacitor 142 to the phase detector 31 at the midpoint connection of two series connected diodes CR1 and CR2 connected cathode-to-anode across a resistor 162 and coupled by a capacitor 161 to one end of the secondary winding of the transformer T1. A second diode series including cathode-to-anode connected diodes CR3 and CR4 is connected in parallel bias across diodes CR1 and CR2 providing at the midpoint thereof a signal indicative of the phase difference between the signals developed across capacitors 141 and 142. The midpoint signal between diodes CR3 and CR4 is then smoothed by an R-C network including a series resistor 163, shunted to ground at both ends by capacitors 164 and 165, which drives the base of a transistor Q3 connected between the signal B+ and an emitter resistor 170 to form an emitter follower configuration developing the signal C across the emitter resistor 170. In order to provide a null adjustment of the detector 31 the midpoint connection between diodes CR1 and CR2 is further connected to a biasing circuit including a variable resistor 171 connected between the cathode of diode CR1 to the signal B+.

In this manner the signal developed across coil 11 is clipped by the saturating limits of amplifier 111 and converted to a square wave of a constant amplitude between B+ and ground by transistors Q4 and Q5 to provide a driving signal to the primary winding of transformer T1. The secondary winding of transformer T1 is tied to the square wave frequency by the capacitor 161 and resistor 162 which is alternatively shorted by diodes CR1 and CR2 according to the signal developed across capacitor 142. Thus diodes CR1 and CR2 act as a phase splitter biased by the variable resistor 171. Any phase difference between the two square wave signals causes one of the diodes to conduct more heavily thereby imposing an unbalanced output signal at diodes CR3 and CR4. Thus a signal linearly indicative of the phase difference between the two square waves is produced to control the voltage developed across the emitter resistor 170. In this context it is necessary to note that the signal across capacitor 142 is essentially constant in frequency and amplitude, being indicative of the field components picked up by coil 12. The signal across capacitor 141, on the other hand, is phase responsive to the proximity of coil 11 relative the adjacent sections of loops 16 and 17. Thus the phase difference signal C is directly indicative of the amount of deviation of coil 11 from a virtual signal center between the loops. This signal is then alternatively utilized to either drive a servo controlling a conventional rudder or to drive two servo loops in complement to articulate the angular position of two water jets thereby directing a proportional amount of the stream into respective ones of the turning conduits associated with each jet.

Accordingly a linear guidance system is formed which is essentially insensitive to signal strength variations, and therefore signal noise, other than the signal noise in the bandwidth of the driving frequency of the loops. Such guidance system, furthermore, includes simple and therefore reliable sensors which are compared by circuits which are both simple and accurate.

Obviously, many modifications and variations of the present invention may be made with regard to the foregoing detailed description without departing from the spirit of the invention.

We claim:
1. A guidance system for controlling the lateral motion of a mobile object along a directed path, comprising:
   a source of A.C. electrical power;
   first signal producing means operatively connected across said source of A.C. power, including a first conductor arranged in circuit to form a first elongated loop in a plane parallel with the surface of the path, for producing a first electromagnetic field signal thereabout according to the excitation thereof by said source of A.C. power;
   phase lag means operatively connected at one end thereof across the said source of A.C. power for producing an A.C. excitation signal at the other end thereof at a predetermined phase relationship with said source of A.C. power;

second signal producing means operatively connected across said phase lag means, including a second conductor arranged in circuit to form a second elongated loop disposed in substantial parallel arrangement and partly overlapping said first elongated loop, for producing a second electromagnetic field thereabout according to the excitation of said phase lag means;

first inductive sensor means mounted in said mobile object for producing a first sensor signal indicative of the sum of vector components of said first and second electromagnetic field signals aligned substantially vertical relative the plane of said first and second elongated loops;

second inductive sensor means mounted in said object for producing a second sensor signal indicative of the sum of the vector components of said first and second electromagnetic field signals aligned substantially parallel to the planes of said loops and substantially transverse to the longitudinal axes thereof;

a first and second clipping means connected to respectively receive said first and second sensor signals for producing corresponding first and second square wave signals of fixed amplitudes respectively indicative of the zero crossings of said first and second sensor signals;

phase detector means adapted to receive said first and second square wave signals for producing a control signal indicative of the phase difference therebetween; and control means rendered responsive to said control signal for producing control forces directing the motion of said mobile object in response thereto.

2. Apparatus according to claim 1 wherein:

said first and second signal producing means respectively including a first inductive coil disposed in a plane substantially parallel to the surface of said path and a second inductive coil disposed in said object in a plane substantially vertical relative the surface of said path and parallel to the longitudinal axis of said object, said first and second coils being responsive to the components of said first and second field signals aligned normal to the respective planes thereof.

3. Apparatus according to claim 1 wherein:

said control means further includes a servo amplifier connected to receive at a first input terminal thereof said control signal, a servo motor connected to be driven according to the polarity and amplitude of the output signal from said servo amplifier, force producing means connected to be articulated by said servo motor, and signal producing means connected to said force producing means for producing a feedback signal indicative of the articulation of said force producing means operatively connected to a second input terminal of said servo amplifier, said servo amplifier producing said output signal according to a predetermined combination of said control and feedback signals.

4. Apparatus according to claim 3 wherein:

said force producing means includes a rudder disposed from said object for lateral rotation in response to said servo motor.

5. Apparatus according to claim 3 wherein:

said force producing means includes a fluid jet mounted for lateral rotation from said object producing a force generating fluid stream according to the rotation thereof, a first and second horizontally opposed turning duct mounted from said object having receiving openings aligned with the central axes thereof in substantially horizontal parallel alignment disposed behind said fluid jet to receive selective amounts of said fluid stream according to the rotation of said jet therebetween, said ducts further including substantially opposed outlets aligned with the central axes thereof substantially transverse to the longitudinal axis of said object.

6. Apparatus according to claim 3 wherein:

said first and second clipping means respectively include an operational amplifier connected to receive the corresponding ones of said first and second sensor signals, a push-pull transistor stage including a pair of complementary transistors disposed between respective D.C. signals and operatively connected to be selectively rendered conductive according to the amplitude of said operational amplifier output signal for alternatively producing a positive and negative signal of predetermined amplitude in response to the polarity of the operational amplifier output signal; and said phase detector means including a transformer connected at the primary winding thereof to the corresponding push-pull transistor stage associated with said first clipping means and operatively connected at the secondary winding thereof to the corresponding push-pull transistor stage associated with said second clipping means, and rectifying means connected in parallel across the secondary winding of said transformer for producing said control signal indicative of the phase difference between the primary and secondary windings of said transformer.

7. Apparatus according to claim 3 further comprising:

a first and second power amplifier respectively connected to corresponding ones of said source of A.C. power and to said phase lag means at the input thereof respectively including a first and second output transformer disposed at the output thereof, first and second resonating means respectively connected across and in circuit with the corresponding secondary winding of said first and second output transformer at respective one ends thereof and respectively connecting to corresponding ones of the end terminals of said first and second loops at the other ends thereof, said transformers, resonating means and loops combining to form resonating circuits tuned to the frequency of said source of A.C. power.

8. Apparatus for guiding the lateral motion of a mobile object along a directed path, comprising:

signal generating means for producing a first and second horizontal elongated toroidal electromagnetic field in partial longitudinal overlapping relationship, said first and second electromagnetic field being excited at a preselected frequency of excitation, the frequency of said first field being separated in phase from said second field;

sensing means mounted in said object for selectively sensing the corresponding combined field components of said first and second electromagnetic fields respectively aligned along axis normal to the plane of the torus and along an axis substantially parallel and transverse therewith and for producing respective first and second signals indicative thereof;

phase responsive means connected to receive the first and second signals from said sensing means for producing a corrective signal indicative of the separation of the zero crossings of said first and second electromagnetic fields; and control means responsive to the corrective signal for controlling the lateral motion of the mobile object in response thereto.

9. Apparatus for guiding a boat along a predetermined path, comprising:

signal producing means disposed below the surface of water for producing a longitudinal signal aligned along said path;

signal receiving means disposed in said boat for producing a corrective signal indicative of the lateral deviation of said boat relative said path; and control force generating means mounted from said boat and connected to receive said corrective signal for producing complementary lateral forces proximate the bow and stern of said boat in response to said corrective signal.

10. Apparatus according to claim 9 wherein:

said control force generating means includes a bow and stern fluid jet mounted for lateral rotation in complementary response to said corrective signal below said boat producing corresponding force generating fluid streams according to the rotation thereof, a first and second horizontally opposed turning duct pairs mounted from said object longitudinally aft of said fore and aft jets having corresponding receiving openings aligned with the central axes thereof in substantially horizontal parallel alignment disposed respectively behind said bow and stern fluid jet to receive selective amounts of said associated fluid stream according to the rotation of said jets therebetween, said paired ducts further including substantially opposed outlets aligned with the central axes thereof substantially transverse to the longitudinal axis of said boat.

* * * * *